US012600188B2

(12) United States Patent
Subramanian

(10) Patent No.:  US 12,600,188 B2
(45) Date of Patent:  Apr. 14, 2026

(54) PNEUMATIC SUSPENSION ARRANGEMENT CONTAINING A NON-NEWTONIAN FLUID

(71) Applicant: Volvo Truck Corporation, Gothenburg (SE)

(72) Inventor: Chidambaram Subramanian, Greensboro, NC (US)

(73) Assignee: Volvo Truck Corporation, Gothenburg (SE)

( * ) Notice: Subject to any disclaimer, the term of this patent is extended or adjusted under 35 U.S.C. 154(b) by 16 days.

(21) Appl. No.: 18/903,089

(22) Filed: Oct. 1, 2024

(65) Prior Publication Data

US 2025/0115090 A1      Apr. 10, 2025

(30) Foreign Application Priority Data

Oct. 4, 2023    (EP) .................................... 23201600

(51) Int. Cl.
  B60G 17/015     (2006.01)
  B60G 17/052     (2006.01)
(52) U.S. Cl.
  CPC ..... B60G 17/0155 (2013.01); B60G 17/0523 (2013.01); B60G 2500/30 (2013.01)
(58) Field of Classification Search
  CPC ........... B60G 17/0155; B60G 17/0523; B60G 2500/30
  See application file for complete search history.

(56) References Cited

U.S. PATENT DOCUMENTS

| | | | |
|---|---|---|---|
| 7,896,019 B2 | 3/2011 | Bettin et al. | |
| 9,618,076 B2 * | 4/2017 | Kropp | ................... F16F 15/005 |
| 12,043,077 B2 * | 7/2024 | Subramanian | ..... B60G 17/0565 |
| 2012/0146307 A1 | 6/2012 | Kim | |
| 2024/0010042 A1 | 1/2024 | Subramanian et al. | |

FOREIGN PATENT DOCUMENTS

| | | | | |
|---|---|---|---|---|
| CN | 100478580 C | * | 4/2009 | |
| WO | 8909703 A1 | | 10/1989 | |
| WO | WO-2024068012 A1 | * | 4/2024 | ......... B60G 17/0165 |

OTHER PUBLICATIONS

Extended European Search Report for European Patent Application No. 23201600.6, mailed Apr. 9, 2024, 9 pages.

* cited by examiner

*Primary Examiner* — Faye M Fleming
(74) *Attorney, Agent, or Firm* — Withrow & Terranova, PLLC

(57)     ABSTRACT

A pneumatic suspension arrangement for a vehicle is provided. The pneumatic suspension arrangement comprises: an air bellow for suspending the vehicle, a flow control valve for controlling a first flow of air, a chamber containing a Non-Newtonian Fluid (NNF). a piston configured to be moveable within the chamber. The flow control valve is configured to control a flow rate of the first flow of air based on a ride height of the vehicle. The pneumatic suspension arrangement further comprises a valve assembly configured to further control the first flow of air based on a position of the piston. The chamber is configured to be connected with the flow control valve such that the pneumatic suspension arrangement is operative to push the piston into the NNF of the chamber, based on the flow rate of the first flow of air.

15 Claims, 8 Drawing Sheets

10

PNEUMATIC SUSPENSION ARRANGEMENT CONTAINING A NON-NEWTONIAN FLUID

PRIORITY APPLICATIONS

The present application claims priority to European Patent Application No. 23201600.6, filed on Oct. 4, 2023, and entitled "PNEUMATIC SUSPENSION ARRANGEMENT CONTAINING A NON-NEWTONIAN FLUID," which is incorporated herein by reference in its entirety.

TECHNICAL FIELD

The disclosure relates generally to controlling a pneumatic suspension arrangement. In particular aspects, the disclosure relates to a pneumatic suspension arrangement containing a Non-Newtonian Fluid (NNF). The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

For controlling a ride height of a vehicle, pneumatic suspension arrangements may be used. A prior art pneumatic suspension arrangement 1 of a vehicle is illustrated in FIG. 1. A levelling pneumatic flow control valve 2 provides a closed circuit mechanism for maintaining a ride height of the vehicle. As the ride height falls below a preferred or required ride height, the levelling pneumatic flow control valve 2 opens an air flow between a source of pressurized air 3 and an air bellow 4, and thereby increasing the pressure in the air bellow 4 to increase the ride height. Similarly, if the ride height is more than the required or preferred ride height, the levelling pneumatic flow control valve 2 shuts the path from the source of pressurized air 3 to the air bellow 4 and opens a flow between the air bellow 4 to the atmosphere via an exhaust port 5. A current ride height may be controlled by the use of a control lever 6 and a push rod 7 connected to an axle 8 of a wheel 9. The push rod 7 will move the control lever 6 when the ride height changes with respect to the axle 8 which thereby controls flow of pressurized air to the air bellow 4. This manner of controlling the flow of pressurized air leads to an excessive air consumption as most types of driving operations, even minor operations will at least temporarily shift a ride height of the vehicle 1 and consume pressurized air, e.g., when braking, when accelerating, when driving on a rough profile road, when lane changes due to a lateral load shift. The air consumed is often related to operations which leads to temporary ride height changes, i.e., when the ride height will change for a short time period and then change back again. On a simple road test, it was found that 20 Liters (L) of air may be consumed in pneumatic suspension arrangements for a 2 mile drive. As pressurized air needs to be generated by a fuel-driven compressor, excessive fuel consumption follows as a consequence.

Hence, there is a desire to more efficiently control the use of pressurized air in a pneumatic suspension arrangement.

SUMMARY

According to a first aspect of the disclosure, a pneumatic suspension arrangement for a vehicle is provided. The pneumatic suspension arrangement comprises an air bellow for suspending the vehicle. In particular, the air bellow may be for suspending a chassis of the vehicle. The pneumatic suspension arrangement comprises a source of pressurized air. The pneumatic suspension arrangement comprises a flow control valve for controlling a first flow of air. The first flow of air is arranged to be directed from the source of pressurized air to the air bellow, or from the air bellow to an exhaust of the flow control valve. The flow control valve is configured to control a flow rate and direction of the first flow of air based on a ride height of the vehicle. The pneumatic suspension arrangement comprises a chamber. The chamber contains an NNF. A property of NNF is that the viscosity of the NNF changes when applied with a force, e.g., such that it may change from a fluid to a solid based on an applied force. The pneumatic suspension arrangement comprises a piston configured to be moveable within the chamber. The chamber and the piston is configured such that the NNF is able to flow around the piston in response to a movement of the piston within the chamber. The pneumatic suspension arrangement comprises a valve assembly configured to further control the first flow of air based on a position of the piston. The chamber is configured to be connected with the flow control valve such that the pneumatic suspension arrangement is operative to push the piston into the NNF of the chamber based on the flow rate of the first flow of air.

The first aspect of the disclosure may seek to solve the problem of excessive air consumption in pneumatic suspension arrangements. A technical benefit may include efficiently controlling usage of pressurized air, in particular with respect to ride height changing actions of the vehicle which are temporary and which are changed back to an initial ride height, or within a range of the initial ride height during a short period of time, e.g., relating to any one or more out of: fast accelerations, hard braking, bumps on roads, the vehicle temporarily travelling on rough terrain, lane switching, etc. Air usage is more efficiently controlled in the pneumatic suspension arrangement since the flow rate of the first flow of air is determined based on the ride height of the vehicle. This means that the piston may be pushed into the NNF by the first flow of air based on the ride height. Since a property of NNF is that viscosity of the NNF is increased when the NNF is applied with a force, the piston will be temporarily blocked or slowed down by the NNF when the piston is pushed into the chamber based on the flow rate of the first flow of air. This further means that the piston will be increasingly slowed down, or blocked with a high flow rate of the first flow of air. In other words, the NNF will ensure that the piston movement will be slowed down significantly when the ride height changes rapidly, e.g., due to fast acceleration/braking/lane changes. It follows that when the first flow of air is applied due to a ride height change, the piston position will at least partly be based on how rapidly the ride height changes, and the valve assembly will thereby be enabled to control the first flow of air based on how rapidly the ride height changes. The valve assembly is thereby enabled to block or reduce usage of air related to rapid ride height changes, and thereby efficiently control air consumption of the pneumatic suspension arrangement.

As an example, the first flow of air may be blocked or reduces until the piston is pushed to a certain position in the chamber, e.g., until reaching a first section of the chamber. When the flow rate of the first flow of air is high, e.g., higher than a threshold, the piston will reach said certain position at a later time, and thereby only allowing air consumption for ride height changing conditions which remain for an extended period of time.

Optionally in some examples, including in at least one preferred example, the pneumatic suspension arrangement is configured such that the flow control valve is operative to control the first flow of air based on a control flow of air. In some of these examples, the valve assembly is configured to control the control flow of air based on the position of the piston.

A technical benefit may include a more efficient control of air. This is since the first flow of air may be controlled based on any suitable control flow, e.g., which may control the flow control valve to block or allow the first flow of air to the exhaust or to the air bellow.

Optionally in some examples, including in at least one preferred example, the pneumatic suspension arrangement according is further configured such that when the piston is positioned outside a first section of the chamber, the first flow of air is blocked by the pneumatic suspension arrangement.

A technical benefit may include a more efficient control of air, in particular a reduced air consumption of the pneumatic suspension arrangement. This is since the piston is for high flow rates delayed or blocked by the NNF to reach the first section and the first flow of air is blocked by the pneumatic suspension arrangement until the piston reaches the first section. This means that for rapid changes in ride height, the piston will be delayed to the first section and no air will be consumed. If the ride height changes back quickly, e.g., within a distance from the initial ride height, the first flow of air may not push down the piston any further, and thereby no air may be consumed. The first flow of air being blocked by the pneumatic suspension arrangement as used herein may mean that the first flow of air still pushes the piston into the NNF but the first flow of air cannot reach its destination, e.g., the exhaust or the air bellow.

Optionally in some examples, including in at least one preferred example, the pneumatic suspension arrangement is configured such that the valve assembly comprises a first channel comprised in the piston. In these examples, the first channel is arranged to control the first flow of air based on an alignment of the first channel with a first inlet and a first outlet of the chamber. In these examples, the pneumatic suspension arrangement is configured such that the first flow of air is directed to flow to the air bellow or to the exhaust, via the first inlet, the first channel, and the first outlet.

A technical benefit may include a more efficient control of air, in particular a reduced air consumption of the pneumatic suspension arrangement. This is since the first channel needs to be aligned with the first inlet and the first outlet of the chamber for the first flow of air to flow to the air bellow or to the exhaust, via the first inlet, the first channel, and the first outlet. This means that the piston needs to be pushed into the NNF to align the first channel with the first inlet and the first outlet of the chamber. Since the NNF delays the piston when the flow rate of the first flow of air is high, air consumption will be reduced.

Optionally in some examples, including in at least one preferred example, the pneumatic suspension arrangement is configured such that the valve assembly comprises a second channel comprised in the piston. In these examples, the second channel is arranged to control a second flow of air based on an alignment of the second channel with a second inlet and a second outlet of the chamber. In these examples, the pneumatic suspension arrangement is configured such that the second flow of air is a flow directed from a second control air pressure source via the second inlet, the second channel, and the second outlet, to a block port of the flow control valve, which when pressurized, the flow control valve is configured to restrict or block the first flow of air from passing through the flow control valve.

A technical benefit may include a more efficient control of air, in particular a reduced air consumption of the pneumatic suspension arrangement. This is since the second channel needs to be unaligned with the second inlet and the second outlet of the chamber for the first flow of air to flow to the air bellow or to the exhaust, otherwise the block port of the flow control valve will be pressurized and the first flow of air will be blocked by the flow control valve. Since the NNF delays the piston when the flow rate of the first flow of air is high, the alignment of the second channel and the second inlet and the second outlet may remain for an extended period of time due to viscosity increase of the NNF thereby blocking the first flow of air until the NNF viscosity is reduced and/or the piston has pressed through the NNF.

Optionally in some examples, including in at least one preferred example, the pneumatic suspension arrangement is configured such that the valve assembly comprises a third channel comprised in the piston. In these examples, the third channel is arranged to control a third flow of air based on an alignment of the third channel with a third a third inlet and third outlet of the chamber. In these examples, the pneumatic suspension arrangement is configured such that the third flow of air is a flow directed to flow from a third control air pressure source via the third inlet, the third channel, and the third outlet, to a control port of the flow control valve, which when pressurized, the flow control valve is configured to allow the first flow of air to pass through the flow control valve.

A technical benefit may include a more efficient control of air, in particular a reduced air consumption of the pneumatic suspension arrangement. This is since the third channel needs to be aligned with the third inlet and the third outlet of the chamber for the first flow of air to flow to the air bellow or to the exhaust, as the control port of the flow control valve needs to be pressurized to allow the first flow of air to pass through the flow control valve. Since the NNF delays the piston when the flow rate of the first flow of air is high, the alignment of the third channel and the third inlet and the third outlet may be delayed for an extended period of time due to viscosity increase of the NNF thereby not allowing the first flow of air until the NNF viscosity is reduced and/or the piston has pressed through the NNF.

Optionally in some examples, including in at least one preferred example, the NNF is a dilatant NNF.

A technical benefit may include a more efficient control of air, in particular a reduced air consumption of the pneumatic suspension arrangement. This is since a dilatant NNF increase viscosity with higher force, at least for a period of time, thereby slowing down a piston movement into the dilatant NNF increasingly based on the flow rate of the first flow of air. Since the flow rate of the first flow of air is based on the ride height, rapid changes in ride height will result in a high flow rate, and thereby the dilatant NNF will ensure that the pneumatic suspension arrangement does not, or at least delays, any air consumption caused by rapid ride height changes.

Optionally in some examples, including in at least one preferred example, the pneumatic suspension arrangement is configured such that the first flow of air is controlled by a lever of the flow control valve. In these examples, the lever is configured to control the flow rate and the direction of the first flow of air.

A technical benefit may include a more efficient control of air, this is since the first flow of air is accurately controlled by a lever.

Optionally in some examples, including in at least one preferred example, the pneumatic suspension arrangement is configured such that the lever is connected with, and controlled by, a push rod, wherein the push rod is connected with an axle of the vehicle. In these examples, the push rod is arranged to control the lever when a ride height of the vehicle changes with respect to the axle.

A technical benefit may include a more efficient control of air, this is since the ride height is accurately controlled by direct mechanical connection with the axle.

Optionally in some examples, including in at least one preferred example, the pneumatic suspension arrangement comprises a motor configured to excite the NNF based on a trigger condition. In these examples, exciting the NNF comprises applying a force to the NNF using said motor.

A technical benefit may include a more efficient control of air, in particular a reduced air consumption of the pneumatic suspension arrangement. This is since when the motor applies the force to the NNF, the NNF will increase its viscosity and even further delay or block the pistons movement into the NNF and the chamber.

Optionally in some examples, including in at least one preferred example, the motor is configured to excite the NNF by any one or more out of:

vibrating the chamber, pushing a second piston into the chamber with a force increasing or maintaining the viscosity of the NNF, and driving a pump configured to pulsate the first flow of air.

A technical benefit may include a more efficient control of air, in particular a reduced air consumption of the pneumatic suspension arrangement.

Optionally in some examples, including in at least one preferred example, the motor is configured to excite the NNF repeatedly, as long as the trigger condition is fulfilled.

A technical benefit may include a more efficient control of air, in particular a reduced air consumption of the pneumatic suspension arrangement. This is since when the motor can ensure that the NNF blocks or slows down the piston until the trigger condition is fulfilled.

According to a second aspect of the disclosure a computer system comprising processing circuitry configured to control the motor of the pneumatic suspension arrangement according to the first aspect is provided. The processing circuitry is configured to excite the NNF of the pneumatic suspension arrangement based on a trigger condition. The processing circuitry is configured to excite the NNF by applying a force to the NNF using said motor.

The second aspect of the disclosure may seek to solve the problem of excessive air consumption in pneumatic suspension arrangements.

A technical benefit may include a more efficient control of air, in particular a reduced air consumption of the pneumatic suspension arrangement. This is since when the motor applies the force to the NNF, the NNF will increase its viscosity and even further delay or block the pistons movement into the NNF and the chamber.

Optionally in some examples, including in at least one preferred example, the processing circuitry is further configured to excite the NNF repeatedly, as long as the trigger condition is fulfilled. A technical benefit may include a more efficient control of air, in particular a reduced air consumption of the pneumatic suspension arrangement.

Any suitable examples and technical benefits of the second aspect applies to the first aspect and vice versa.

According to a third aspect of the disclosure, a vehicle comprising the pneumatic suspension arrangement according to the first aspect is provided. Optionally in some examples, including in at least one preferred example, the vehicle comprises the computer system of any of the second aspect.

Any suitable examples and technical benefits of the third aspect applies to the first aspect and/or second aspect and, vice versa.

According to a fourth aspect of the disclosure, a computer-implemented method for controlling a motor in a pneumatic suspension arrangement according to the first aspect is provided. The method comprises, by a processing circuitry of a computer system, exciting an NNF of the pneumatic suspension arrangement based on a trigger condition.

Optionally in some examples, including in at least one preferred example, the method comprises, by the processing circuitry of the computer system, repeating exciting the NNF of the pneumatic suspension arrangement as long as the trigger condition is fulfilled.

Any suitable examples and technical benefits of the fourth aspect applies to the first aspect and/or second aspect and, vice versa.

According to a fifth aspect of the disclosure, a computer program product is provided. The computer program product comprises program code for performing, when executed by the processing circuitry, the method according to the fourth aspect.

Any suitable examples and technical benefits of the fifth aspect applies to the first aspect and/or second aspect and/or fourth aspect and, vice versa.

According to a sixth aspect of the disclosure a non-transitory computer-readable storage medium is provided. The non-transitory computer-readable storage medium comprises instructions, which when executed by the processing circuitry, cause the processing circuitry to perform the method according to the fourth aspect.

Any suitable examples and technical benefits of the sixth aspect applies to the first aspect and/or second aspect and/or fourth aspect and/or fifth aspect and, vice versa.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

Figure 2:
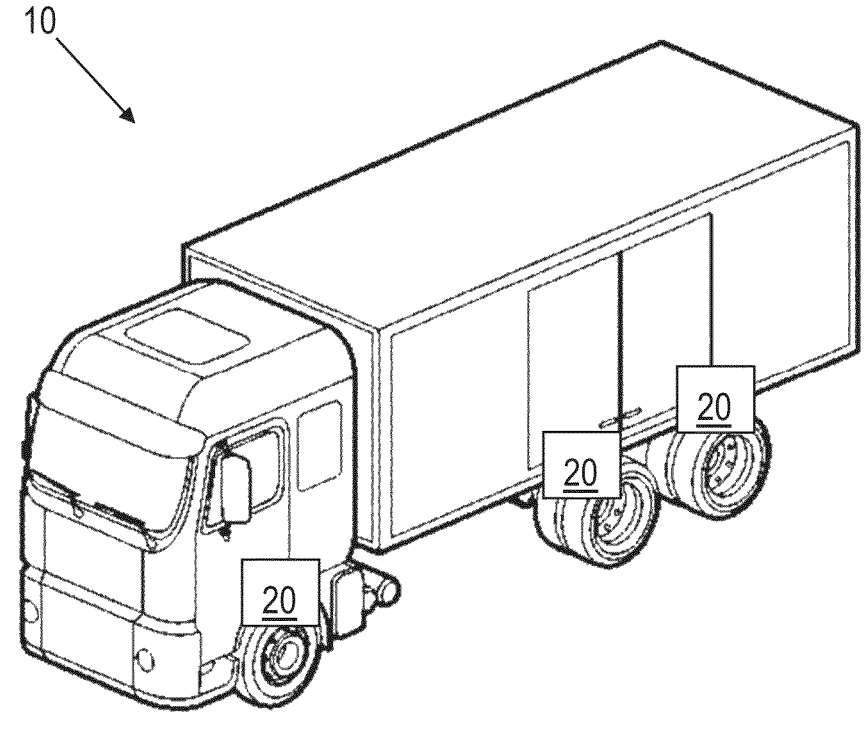
FIG. 2 is an exemplary vehicle according to an example.
Figure 2:
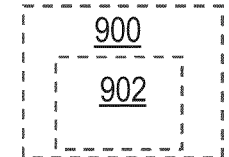

FIG. 2 illustrates an exemplary vehicle 10.

While FIG. 2 illustrates a truck, the vehicle 10 may be any suitable vehicle such as a heavy duty vehicle, a bus, a car, a truck, a tractor, etc.

The vehicle 10 comprises a pneumatic suspension arrangement 20.

The pneumatic suspension arrangement 20 may be arranged to suspend the vehicle 10, e.g., a chassis of the vehicle 10.

The pneumatic suspension arrangement 20 may be configured to level a ride height of the vehicle 10

The pneumatic suspension arrangement 20 may be arranged to be connected with one or more out of the axles of the vehicle, e.g., each axle of the vehicle 10 may have a corresponding system or be part of the pneumatic suspension arrangement.

Methods herein may be performed by a computer system 900 and/or a processing circuitry 902.

The computer system 900 and/or the processing circuitry 902 may be comprised in the vehicle 10, or comprised in a remote location such as in a server or in a cloud service.

The computer system 900 and/or a processing circuitry 902 may be communicatively connected to any suitable entity of the vehicle 10. In other words, the computer system 900 and/or a processing circuitry 902 may be able to control and/or communicate with any suitable entity of the vehicle 10.

The computer system 900 and/or a processing circuitry 902 may be, or be part of an Electronic Control Unit (ECU) of the vehicle 10.

Figure 3:
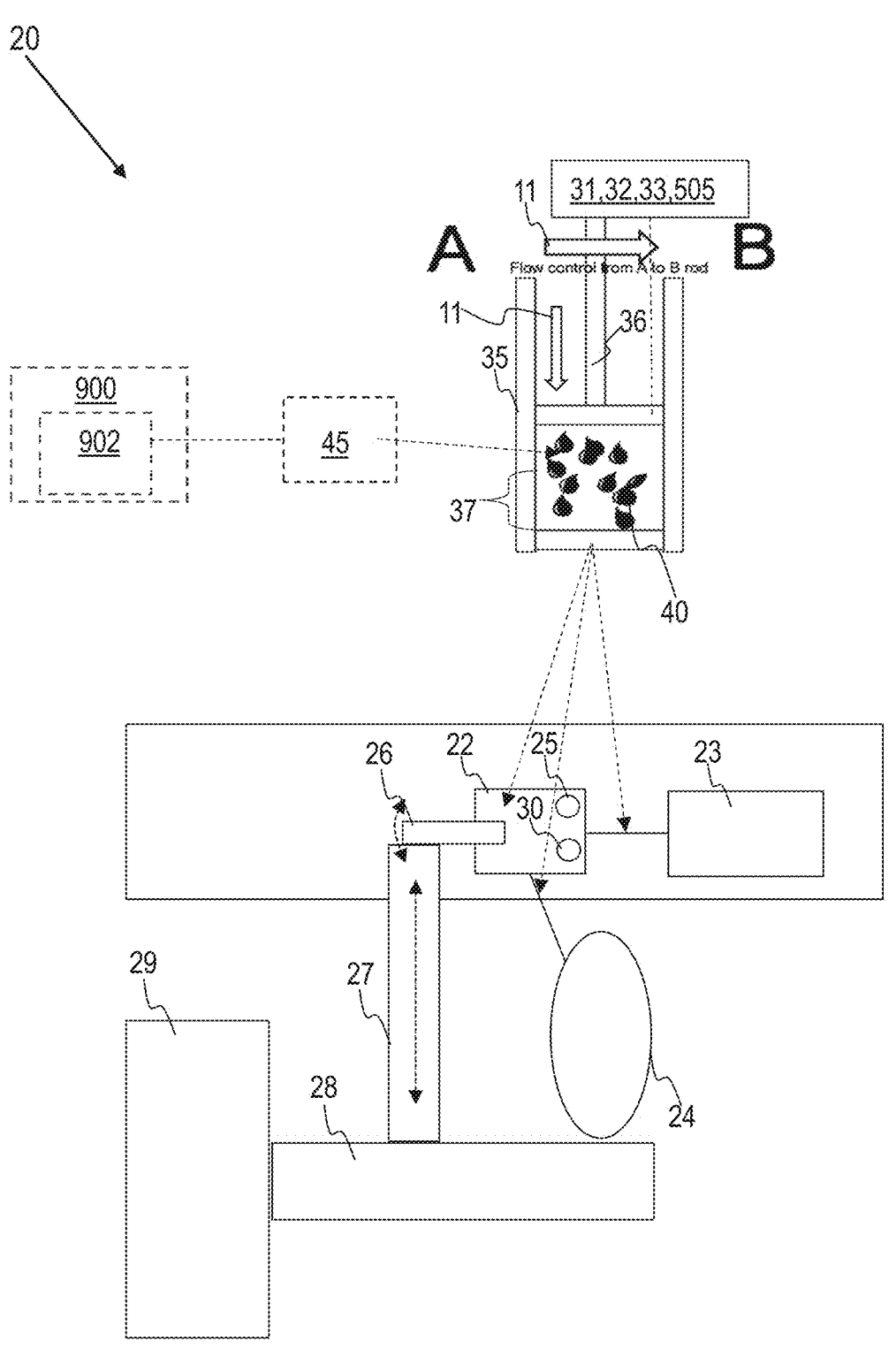
FIG. 3 is an exemplary pneumatic suspension arrangement according to an example.

The pneumatic suspension arrangement 20 will now further be described in FIG. 3, and then with further additional examples and/or alternatives in FIGS. 4A-4C, and FIG. 5.

FIG. 3 is an exemplary illustration of the pneumatic suspension arrangement 20 according to one example.

The pneumatic suspension arrangement 20 comprises an air bellow 24 for suspending the vehicle 10. In particular, the air bellow 24 may be arranged to suspend a chassis of the vehicle 10. The air bellow 24 may also be referred to as an air bag.

The pneumatic suspension arrangement 20 may be arranged to suspend an axle 28, with respect to a wheel 29 of the axle 28. While only one axle will be discussed, the pneumatic suspension arrangement may be arranged in the same manner for each axle of the vehicle 10.

The pneumatic suspension arrangement 20 comprises a source of pressurized air 23. The source of pressurized air 23 may be an air tank, an air tank, or other suitable container of pressurized air.

The pneumatic suspension arrangement 20 comprises a flow control valve 22 for controlling a first flow of air 11. The flow control valve 22 may have different configurations, e.g., which may be configured to block or allow the first flow of air to pass through the flow control valve 22.

The first flow of air 11 is arranged to be directed from the source of pressurized air 23 to the air bellow 24, or from the air bellow 24 to an exhaust 25 of the flow control valve 22. The exhaust 25 may be an exhaust to the atmosphere, i.e., the for letting out air outside the vehicle 10.

In FIG. 2, the first flow of air 11 is directed from A to B, which may be from the source of pressurized air 23 to the air bellow 24, or from the air bellow 24 to an exhaust 25.

In other words, the first flow of air 11 may be either for filling the air bellow 24, or for exhausting air out of the air bellow 24. Embodiments and/or examples herein may be used for controlling any part of the first flow of air 11 external and/or internal to the flow control valve 22.

The first flow of air 11 may be arranged to be a flow that is arranged to go via the flow control valve 22, such that the flow control valve 22 can control the first flow of air 11, e.g., by blocking or allowing the air through the flow control valve 22.

The flow control valve 22 is configured to control a flow rate and direction of the first flow of air 11 based on a ride height of the vehicle 10.

The direction of the first flow of air 11 is from the source of pressurized air 23 to the air bellow 24 or from the air bellow 24 to the exhaust 25.

For example, the pneumatic suspension arrangement 20 may be configured such that the first flow of air 11 is controlled by a lever 26 of the flow control valve 22. The position of the lever 26 may be affected by a ride height of the vehicle 10. The flow control valve 22 may comprise the lever 26 or be connected to the lever 26. In these examples, the lever 26 is configured to control the flow rate and the direction of the first flow of air 11. The lever 26 may be connected with, and controlled by, a push rod 27. The push rod 27 is connected with the axle 28 of the vehicle 10. The push rod 27 is arranged to control the lever 26 when a ride height of the vehicle 10 changes with respect to the axle 28. This means that when the ride height of the vehicle changes, the push rod will move the lever 26 up and down, thereby affecting the flow rate of the first flow of air 11, and the direction of the flow, e.g., to be directed from the source of pressurized air 23 to the air bellow 24, or from the air bellow 24 to an exhaust 25 of the flow control valve 22. The magnitude of moving the lever may correspond to a flow rate in the first flow of air 11, i.e., the more the push rod 27 pushes the lever 26, the higher the flow rate of the first flow of air 11.

The ride height and control of flow rate may also be determined by any other suitable means of detection. For example, a sensor in the flow control valve 22 may measure the ride height distance and a control unit of the flow control valve 22 may control the flow rate and direction of the flow accordingly.

The pneumatic suspension arrangement 20 comprises a chamber 35 containing an NNF 40.

The chamber 35 may be a cylinder or any other suitable hollow area containing the NNF 40.

The NNF 40 may be a dilatant NNF.

The NNF 40 has a property making it harder, i.e., has increasing viscosity, as it is applied with a force.

The NNF 40 viscosity may further be based on a temperature of the NNF 40.

This means that when the NNF 40 is applied with a force above a threshold, the NNF 40 behaves as a solid.

The NNF 40 becomes harder, i.e., has increasing viscosity, with an increasing force, e.g., up to a maximum viscosity of the NNF 40.

The viscosity of the NNF 40 may be a function of time, i.e., the NNF 40, as it is applied with a force, may maintain or increase viscosity for a period of time depending on the type of NNF.

The viscosity of the NNF 40 may have any suitable function of viscosity with respect to the force applied, e.g., typically linear up to a point of viscosity where the viscosity.

When a force is applied to the NNF 40 which is below a threshold, the viscosity of the NNF is not affected or increased by a small amount, e.g., below a threshold. This means that when a force below the threshold is applied to the NNF 40, the NNF 40 behaves similar to water or other low viscosity fluid.

Force on NNF 40 changes the viscosity (hardness) of the fluid. Basically, like water when pushed slowly, and like a solid when pushed hard.

The NNF 40 may be selected to have any suitable viscosity changing property.

The pneumatic suspension arrangement 20 comprises a piston 36 configured to be moveable within the chamber 35. In other words, the chamber 35 may be configured to receive the piston 36.

The chamber 35 and piston 36 is configured such that the NNF 40 is able to flow around the piston 36 in response to a movement of the piston 36 within the chamber 35. The NNF 40 may only be able to flow around the piston 36 when below a set viscosity, i.e., when the NNF 40 behaves like a fluid. When the NNF 40 behaves like a solid, i.e., has high viscosity, above a threshold, the NNF 40 may not flow around the piston 36, instead it may hinder the piston's movement in the chamber 35.

The pneumatic suspension arrangement 20 a valve assembly 31, 32, 33, 505 configured to further control the first flow of air 11 based on a position of the piston 36.

Control herein may mean to block or limit the first flow of air 11, in particular when the piston 36 is outside a first section 37 of the chamber which will be discussed in some further examples.

In other words, the pneumatic suspension arrangement 20 may be configured such that when the piston 36 is positioned outside the first section 37 of the chamber 35, the first flow of air 11 is blocked by the pneumatic suspension arrangement 20.

The valve assembly 31, 32, 33, 505 may be configured to control the first flow of air 11 in any suitable manner based on the position of the piston 36, e.g., the position being relative to the chamber 35.

The valve assembly 31, 32, 33, 505 may be configured to control the first flow of air 11 by the piston 36 blocking the first flow of air 11, and/or the piston 36 interacting with one or more control flows to the flow control valve 22, which one or more control flows causes the flow control valve 22 to block or allow the first flow of air 11 to pass through the flow control valve 22.

The valve assembly 31, 32, 33, 505 may typically be represented by a side channel of/in the piston 36, which opens and/or closes the one or more control flows to the flow control valve 22, and/or closes/opens to the first flow of air 11, e.g., to the flow control valve 22 and/or to its destination, e.g., when the piston 36 is pushed to the first section 37.

In other words, the pneumatic suspension arrangement 20 may further be configured such that the flow control valve 22 is operative to control the first flow of air 11 based on a control flow of air 12, 13. In these examples the valve assembly 31, 32, 33, 505 is configured to control the control flow of air 12, 13 based on the position of the piston 36.

The chamber 35, piston 36, and/or the valve assembly 31, 32, 33, 505, may be arranged internal to the flow control valve 22, and/or may be external to the flow control valve 22, e.g., by interacting with the first flow of air between the flow control valve 22 and the air bellow 24 and/or between the flow control valve 22 and the source of pressurized air 23.

The chamber 35 is configured to be connected with the flow control valve 22, e.g., fluidly connected, such that the pneumatic suspension arrangement 20 is operative to push the piston 36 into the NNF 40 of the chamber 35 based on a flow rate of the first flow of air 11. In other words, the pneumatic suspension arrangement 20 may be configured such that the chamber 35 is connected, e.g., fluidly-connected, with the flow control valve 22 such that the first flow of air 11 is arranged to push the piston 36 into the NNF 40 of the chamber 35.

The piston 36 may be pushed towards an end of the chamber 35 and/or towards any suitable section of the chamber 36. There may be a mechanism for moving back the piston 36 to an initial position, e.g., when the first flow of air 11 is below a threshold, e.g., by using a spring which push the piston 35 back into an initial position. The spring (not illustrated) may be arranged within the chamber 36, e.g., in the first section 37.

When the flow rate is high, e.g., rapidly changed from a low flow rate, the piston 36 will be pushed hard, i.e., with force. This means that the NNF 40 will be pushed by the piston 36 with a high force, and thereby act as a solid or partly as a solid, thereby temporarily block and/or significantly retard a movement of the piston 36 in the chamber.

Since the valve assembly 31, 32, 33, 505 is able to control the first flow of air 11 based on the position of the piston, the controlling mechanism of the valve assembly 31, 32, 33, 505 will be delayed when the piston 36 is pushed hard.

Thereby, rapid changes in the pneumatic suspension arrangement 20 will have a delay in response in terms of filling or exhausting the air bellow 24 using the first flow of air 11.

This allows momentary or temporary changes in ride height to not affect the air consumption of the pneumatic suspension arrangement 20, as the flow rate of the first flow of air 11 may only be high for a short period of time, and the NNF 40 and will ensure that the piston stays in position or does not reach a position where the valve assembly 31, 32, 33, 505 allows for the first flow of air 11 to flow.

The pneumatic suspension arrangement 20 may in some examples further comprise a motor 45 configured to excite the NNF 40 based on a trigger condition. The trigger condition may be based on any suitable vehicle condition parameters, e.g., relating to the motion of the vehicle 10, e.g., and further based on heuristics and/or a trained statistical model. Exciting the NNF 40 may comprise applying a force to the NNF 40 using said motor 45, e.g., and thereby increasing or maintaining a viscosity of the NNF 40.

The pneumatic suspension arrangement 20 may be configured to excite the NNF 40 using said motor 45 by any one or more out of:
   vibrating the chamber 35,
   pushing a second piston into the chamber 35 with a force increasing or maintaining the viscosity of the NNF 40, and
   driving a pump configured to pulsate the first flow of air 11.

All of the above may be performed with a force to at least maintain a viscosity of the NNF 40, e.g., when the viscosity is above a threshold, or to increase the viscosity to above a threshold.

The motor 45 may be configured to excite the NNF 40 repeatedly, as long as the trigger condition is fulfilled.

As an example, the motor 45 may be controlled and/or operated by the computer system 900 and/or the processing circuitry 902.

In other words, the computer system 900 comprising the processing circuitry 902 may be configured to control the motor 45 in the pneumatic suspension arrangement 20. The processing circuitry 902 may be configured to excite the NNF 40 of the pneumatic suspension arrangement 20 based on a trigger condition, e.g., the trigger condition described above. The processing circuitry 902 may be configured to excite the NNF 40 by applying a force to the NNF 40 using said motor 45.

The processing circuitry 902 may further be configured to excite the NNF 40 repeatedly, as long as the trigger condition is fulfilled.

Figure 4A:
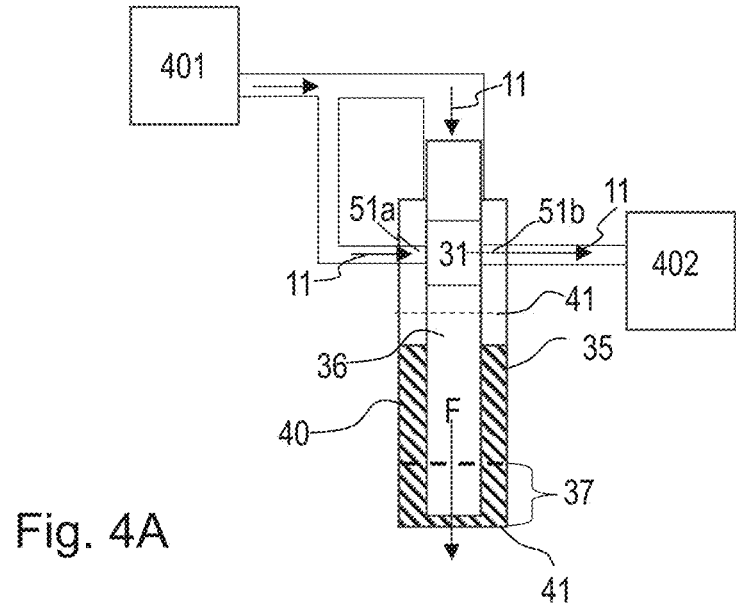
FIG. 4A-4C are an exemplary pneumatic suspension arrangement according to combinable examples.

FIG. 4A is an exemplary pneumatic suspension arrangement according to an example.

In this example, the first flow of air 11 is flowing from a first source 401, e.g., the source of pressurized air 23 or the air bellow 24, directed towards a first destination 402, e.g., the air bellow 24 or the exhaust 25.

The first flow of air 11 is arranged to push the piston 36 down into the NNF 40 of the chamber 35 with a force F. The force F is based on the flow rate of the first flow of air 11.

The pneumatic suspension arrangement 20 according may be configured such that the valve assembly 31, 32, 33, 505 comprises a first channel 31 comprised in the piston 36.

The first channel 31 may be arranged to control the first flow of air 11 based on an alignment of the first channel 31 with a first inlet 51_a_ and a first outlet 51_b_ of the chamber 35.

The first channel 31 may only align with first inlet 51_a_ and the first outlet 51_b_ of the chamber 35 when the piston is positioned within the first section 37. Hence, when the viscosity of the NNF 40 is high, e.g., higher than a threshold, the alignment will be delayed based on the NNF 40 viscosity and duration of the first flow of air 11.

The pneumatic suspension arrangement 20 may be configured such that the first flow of air 11 is directed to flow to the air bellow 24 or to the exhaust 25, i.e., from the first source 401 to the first destination 402, via the first inlet 51_a_, the first channel 31, and the first outlet 52_b_.

In other words, in this example, the first flow of air 11 needs to press down the piston 36 into the NNF, e.g., possibly delayed or blocked due to the NNF 40 viscosity, to reach the first section 37 for the first flow of air 11 to be able to pass through the first channel 31 and further to the first destination 402.

The pneumatic suspension arrangement 20 may comprise a protective member 41, configured to seal the NNF 40 inside the chamber 50. The protective member 41 may be arranged to allow the piston 36 to pass through a channel of the protective member 41. The protective member 41 may be a flange.

Figure 4B:
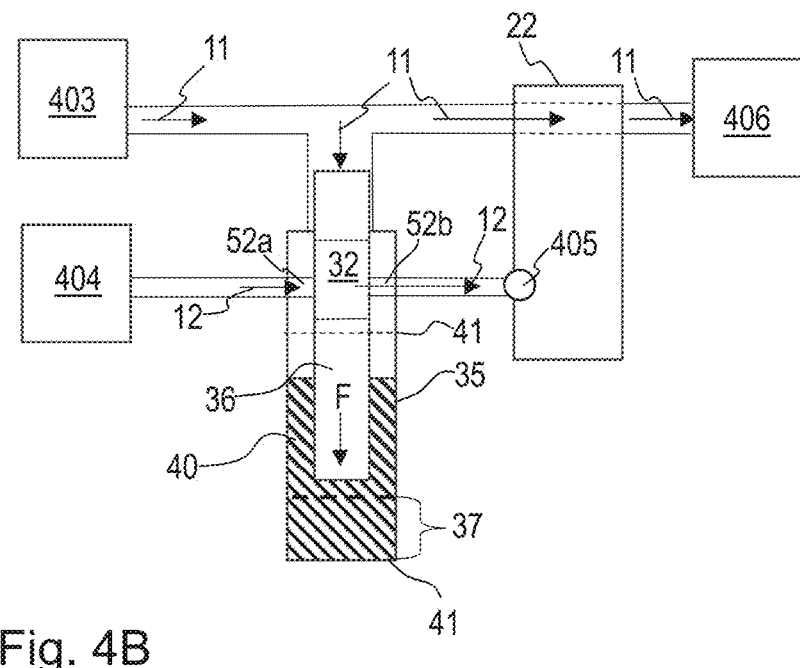

FIG. 4B is an exemplary pneumatic suspension arrangement according to an example.

In this example, the first flow of air 11 is flowing from second source 403, e.g., the source of pressurized air 23 or the air bellow 24, directed towards a second destination 406, e.g., the air bellow 24 or the exhaust 25.

The first flow of air 11 is arranged to push the piston 36 down into the NNF 40 of the chamber 35 with a force F. The force F is based on the flow rate of the first flow of air 11.

The pneumatic suspension arrangement 20 may be configured such that the valve assembly 31, 32, 33, 505 comprises a second channel 32 comprised in the piston 36.

The second channel 32 may be arranged to control a second flow of air 12 based on an alignment of the second channel 32 with a second inlet 52_a_ and a second outlet 52_b_ of the chamber 35.

The pneumatic suspension arrangement 20 may be configured such that the second flow of air 12 is a flow directed from a second control air pressure source 404 via the second inlet 52_a_ the second channel 32, and the second outlet 52_b_, to a block port 405 of the flow control valve 22, which when pressurized, the flow control valve 22 is configured to restrict or block the first flow of air 11 from passing through the flow control valve 22, e.g., from the second source 403 to the second destination 406.

The second channel 32 may only align with second inlet 52_a_ and the second outlet 52_b_ of the chamber 35 when the piston is positioned outside the first section 37. Hence, when the viscosity of the NNF 40 is high, e.g., higher than a threshold, the alignment will be maintained for a duration based on the NNF 40 viscosity and duration of the first flow of air 11 pushing the piston 36.

In other words, in this example, the first flow of air 11 needs to press down the piston 36 into the NNF, e.g., possibly delayed or blocked due to the NNF 40 viscosity, to reach the first section 37 for the second flow of air 12 to be interrupted from pressurizing the control port 405, causing the flow control valve 22 to block the first flow of air 11 to reach the first destination 402.

The pneumatic suspension arrangement 20 may comprise a protective member 41, configured to seal the NNF 40 inside the chamber 50. The protective member 41 may be arranged to allow the piston 36 to pass through a channel of the protective member 41. The protective member 41 may be a flange.

Figure 4C:
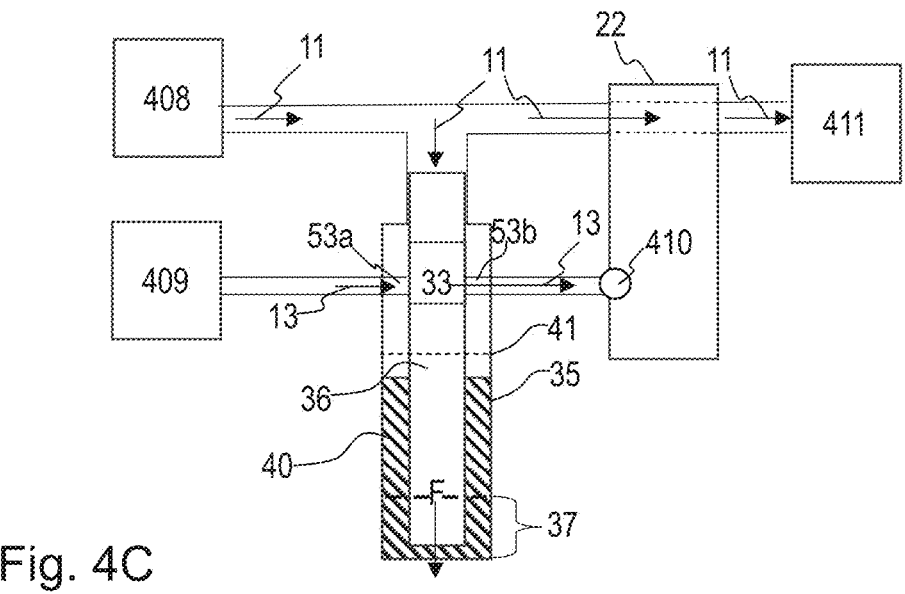

FIG. 4C is an exemplary pneumatic suspension arrangement according to an examples.

In this example, the first flow of air 11 is flowing from third source 408, e.g., the source of pressurized air 23 or the air bellow 24, directed towards a third destination 411, e.g., the air bellow 24 or the exhaust 25.

The first flow of air 11 is arranged to push the piston 36 down into the NNF 40 of the chamber 35 with a force F. The force F is based on the flow rate of the first flow of air 11.

The pneumatic suspension arrangement 20 may be configured such that the valve assembly 31, 32, 33, 505 comprises a third channel 33 comprised in the piston 36.

The third channel 33 may be arranged to control a third flow of air 13 based on an alignment of the third channel 33 with a third inlet 53_a_ and third outlet 53_b_ of the chamber 35.

The pneumatic suspension arrangement 20 may be configured such that the third flow of air 13 is a flow directed to flow from a third control air pressure source 408 via the third inlet 53_a_, the third channel 33, and the third outlet 53_b_, to a control port 409 of the flow control valve 22, which when pressurized, the flow control valve 22 is configured to allow the first flow of air 11 to pass through the flow control valve 22, e.g., from the third source 408 to the third destination 411.

The third channel 33 may only align with third inlet 53_a_ and the third outlet 53_b_ of the chamber 35 when the piston is positioned inside the first section 37. Hence, when the viscosity of the NNF 40 is high, e.g., higher than a threshold, the alignment will be delayed for a duration based on the NNF 40 viscosity and duration of the first flow of air 11 pushing the piston 36.

In other words, in this example, the first flow of air 11 needs to press down the piston 36 into the NNF, e.g., possibly delayed or blocked due to the NNF 40 viscosity, to reach the first section 37 for the third flow of air 13 to be able to pass through the third channel 33 to pressurized the control port 409, causing the flow control valve 22 to allow the first flow of air to the third destination 411.

The pneumatic suspension arrangement 20 may comprise a protective member 41, configured to seal the NNF 40 inside the chamber 50. The protective member 41 may be arranged to allow the piston 36 to pass through a channel of the protective member 41. The protective member 41 may be a flange.

Figure 5:
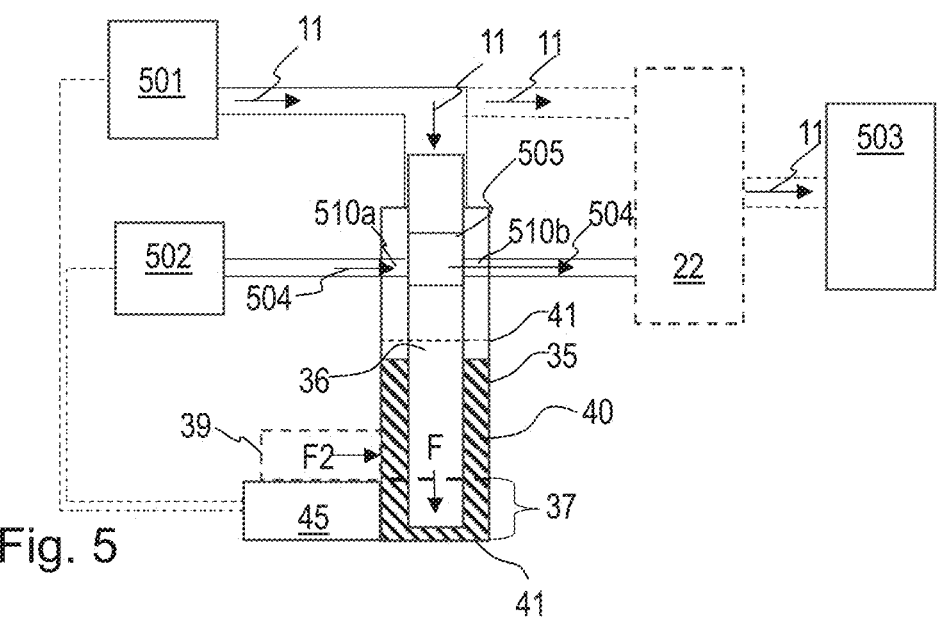
FIG. 5 is an exemplary pneumatic suspension arrangement according to an example.

FIG. 5 is an exemplary pneumatic suspension arrangement according to an example.

In this example, the first flow of air 11 is flowing from fifth source 501, e.g., the source of pressurized air 23 or the air bellow 24, directed towards a fifth destination 503, e.g., the air bellow 24 or the exhaust 25, wherein the first flow of air 11 may go via the flow control valve 22.

The first flow of air 11 is arranged to push the piston 36 down into the NNF 40 of the chamber 35 with a force F. The force F is based on the flow rate of the first flow of air 11.

The pneumatic suspension arrangement 20 may be configured such that the valve assembly 31, 32, 33, 505 comprises a fifth channel 505 comprised in the piston 36.

The fifth channel 505 may be arranged to control a fifth flow of air 504 based on an alignment of the fifth channel 505 with a fifth inlet 510*a* and fifth outlet 510*b* of the chamber 35.

The pneumatic suspension arrangement 20 may be configured such that the fifth flow of air 504 is a flow directed to flow from a fifth air pressure source 502 via the fifth inlet 510*a*, the fifth channel 505, and the fifth 510*b*, to the flow control valve 22.

The fifth flow of air 504 may either be a control flow, for maintaining or blocking the first flow of air 11 to the fifth destination 503 through a block port or a control port of the flow control valve 22, e.g., as in FIGS. 4B and 4C.

As an alternative, the fifth flow of air 504 may be the first flow of air 11, e.g., as in FIG. 4A.

The fifth flow of air 504 may be arranged to flow via the fifth inlet 510*a*, the fifth channel 505 and the fifth outlet 510*b* to the flow control valve 22, e.g., controlling the first flow of air 11 towards the fifth destination 503. As an alternative, when the fifth flow of air 504 is the first flow of air 11, the fifth flow of air 504 may flow via the fifth inlet 510*a*, the fifth channel 505 and the fifth outlet 510*b*, directly to the fifth destination 503.

As an example, the fifth channel 505 may align with fifth inlet 510*a* and the fifth outlet 510*b* of the chamber 35 when the piston 36 is positioned inside the first section 37. Hence, when the viscosity of the NNF 40 is high, e.g., higher than a threshold, the alignment will be delayed for a duration based on the NNF 40 viscosity and duration of the first flow of air 11 pushing the piston 36.

In other words, in this example, the first flow of air 11 needs to press down the piston 36 into the NNF, e.g., possibly delayed or blocked due to the NNF 40 viscosity, to reach the first section 37 for the fifth flow of air 504 to be able to pass through the fifth channel 505 to the flow control valve 22, or directly to the fifth destination 503.

The pneumatic suspension arrangement 20 may comprise a protective member 41, configured to seal the NNF 40 inside the chamber 50. The protective member 41 may be arranged to allow the piston 36 to pass through a channel of the protective member 41. The protective member 41 may be a flange.

The pneumatic suspension arrangement 20 may comprise the motor 45 configured to excite the NNF 40 based on a trigger condition. The NNF 40 comprises applying a force to the NNF 40 using said motor 45.

The motor 45 may be configured to push a second piston 39 into the chamber 35 with a force F2, thereby increasing or maintaining the viscosity of the NNF 40.

Additionally or alternatively, the motor 45 may be configured to excite the NNF 40 by vibrating the chamber 35, e.g., with a third force.

Additionally or alternatively, the motor 45 may be configured to drive a pump configured to pulsate the first flow of air 11 and/or the fifth flow of air 504.

While in FIG. 5, the second piston 39 and the motor 45 is arranged on the side of the chamber 35, the second piston 39 and/or the motor 45 may be arranged in any other suitable manner as long as the motor 45 and/or the piston 39 may be able to interact with the NNF 40 to increase and/or maintain the viscosity of the NNF 40 by applying a force to the NNF 40.

Figure 6:
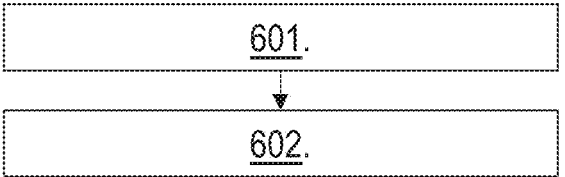
FIG. 6 is an exemplary flow chart of an exemplary method according to an example.

FIG. 6 is an exemplary flow chart of an exemplary computer-implemented method for controlling the motor 45 in the pneumatic suspension arrangement 20. The method may be performed by the computer system 900 and/or by the processing circuitry 902 therein. The method comprises the following actions which may be performed in any suitable order.

Action 601

The method comprises exciting the NNF 40 of the pneumatic suspension arrangement 20 based on a trigger condition.

The trigger condition may comprise, detecting one or more situations where air consumption is excessive, e.g., expected or estimated to be above a threshold.

Detecting one or more situations where air consumption is excessive may be based on a statistical model, e.g., a machine learning model, trained based on any one or more vehicle condition parameters and associated measured air consumption.

Alternatively, detecting one or more situations where air consumption is excessive may be based on a heuristic model, e.g., when the one or more vehicle condition parameters fulfill one or more predefined conditions.

The one or more vehicle condition parameters may comprise any one or more out of:

- a vehicle condition signal indicative of a brake pedal position of the vehicle,
- a vehicle condition signal indicative of a brake pressure of at least one brake of the vehicle,
- a vehicle condition signal indicative of a throttle of an engine of the vehicle,
- a vehicle condition signal indicative of a velocity and/or a speed of the vehicle,
- a vehicle condition signal indicative of a gear and/or a gear shifting of the vehicle,
- a vehicle condition signal indicative of a roll and/or a roll rate of the vehicle,
- a vehicle condition signal indicative of a pitch and/or a pitch rate of the vehicle,
- a vehicle condition signal indicative of a yaw and/or a yaw rate of the vehicle,
- a vehicle condition signal indicative of a steering input of the vehicle, a vehicle condition signal indicative of a load and/or a
weight of the vehicle, a vehicle condition signal indicative of a position of the
vehicle, and a vehicle condition signal indicative of a road profile of a
road travelled by the vehicle.

For example, the one or more predefined conditions in the
heuristics model may comprise a fast turning and/or a fast
acceleration and/or fast braking, as these conditions will
comprise momentary load transfer which may induce the
pneumatic suspension arrangement 20 to compensate for the
load transfer and corresponding change in ride height, which
wastes air for such momentary conditions which will shortly
change back to, an initial ride height or at least within an
interval of the initial ride height.

Exciting the NNF 40 may comprise triggering or operat-
ing the motor 45 to apply a force to the NNF 40 using said
motor 45. The motor 45 may be triggered or operated to
excite the NNF 40 by any one or more out of:

vibrating the chamber 35, pushing the second piston 39 into the chamber 35 with a
force increasing or maintaining the viscosity of the
NNF 40, and driving a pump configured to pulsate the first flow of air
11.

Action 602

The method comprises repeating exciting the NNF 40 of
the pneumatic suspension arrangement 20 as long as the
trigger condition is fulfilled.

Figure 7:
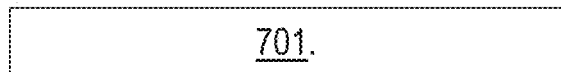
FIG. 7 is an exemplary flow chart of an exemplary method according to an example.

FIG. 7 is an exemplary flow chart of an exemplary
computer-implemented method for controlling the motor 45
in the pneumatic suspension arrangement 20.

Action 701.

The method comprises: by the processing circuitry 902 of
the computer system 900, exciting the NNF 40 of the
pneumatic suspension arrangement 20 based on a trigger
condition.

Action 701 may be combined with actions 601-602 in any
suitable manner.

Figure 1:
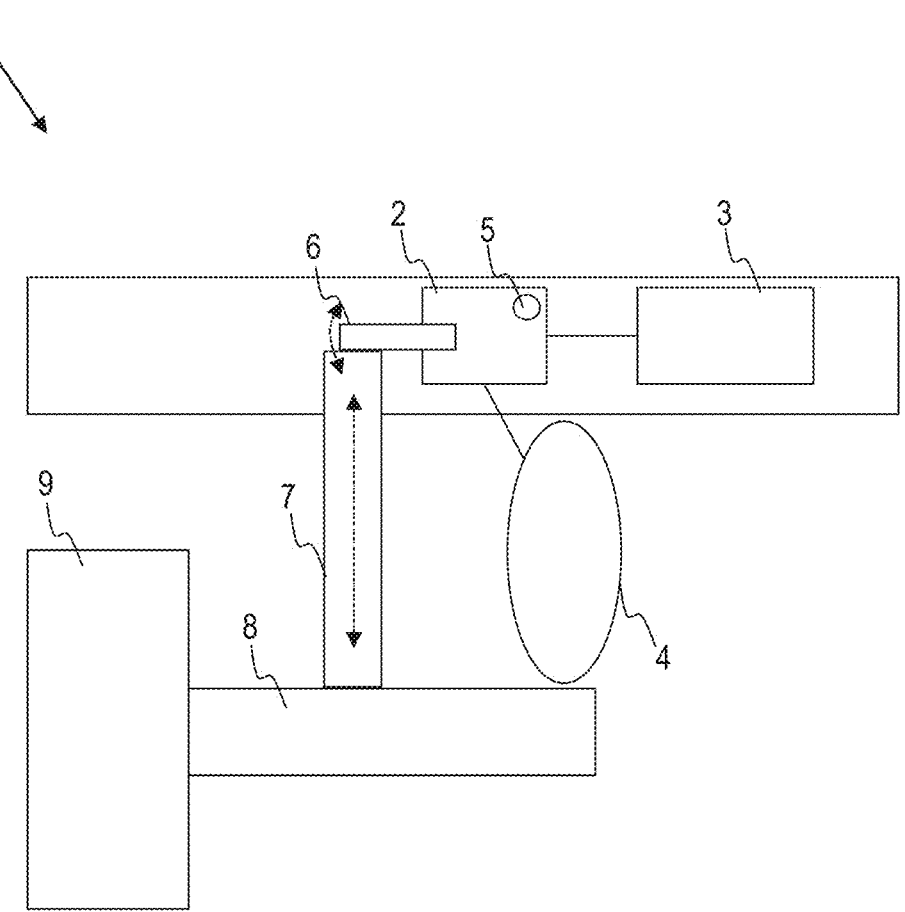
FIG. 1 is an exemplary pneumatic suspension arrangement according to prior art.
Figure 8:
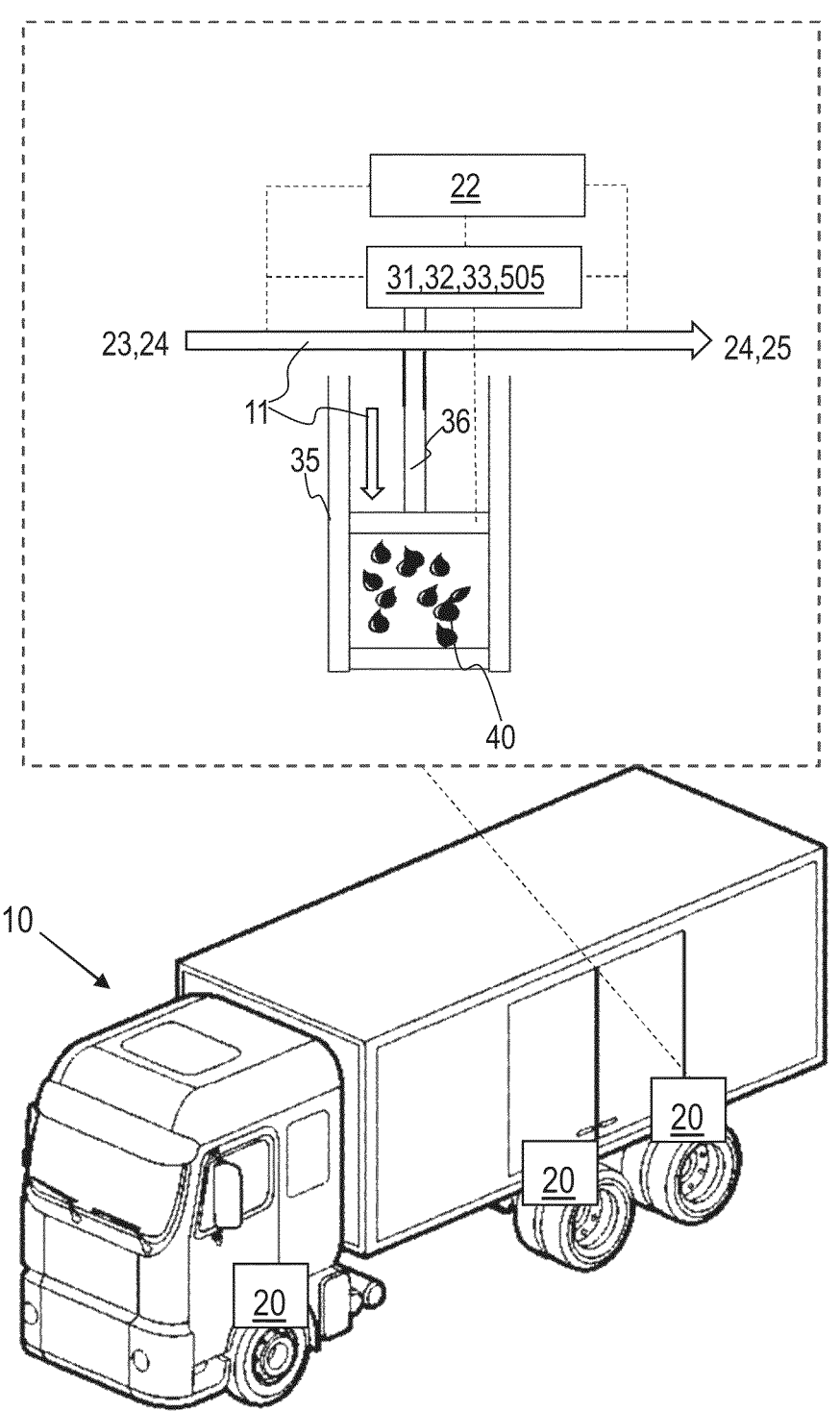
FIG. 8 is another view of FIG. 1, according to an example.

FIG. 8 is another view of FIG. 1, according to an example.
A pneumatic suspension arrangement 20 for a vehicle 10 is
provided. The pneumatic suspension arrangement 20 com-
prises the air bellow 24 for suspending the vehicle 10. The
pneumatic suspension arrangement 20 comprises the source
of pressurized air 23. The pneumatic suspension arrange-
ment 20 comprises the flow control valve 22 for controlling
a first flow of air 11. The first flow of air 11 is arranged to
be directed from the source of pressurized air 23 to the air
bellow 24, or from the air bellow 24 to the exhaust 25 of the
flow control valve 22. The flow control valve 22 is config-
ured to control a flow rate and direction of the first flow of
air 11 based on a ride height of the vehicle 10. The
pneumatic suspension arrangement 20 comprises the cham-
ber 35 containing the NNF 40. The pneumatic suspension
arrangement 20 comprises the piston 36 configured to be
moveable within the chamber 35. The chamber 35 and
piston 36 is configured such that said NNF 40 is able to flow
around the piston 36 in response to a movement of the piston
36 within the chamber 35. The pneumatic suspension
arrangement 20 comprises the valve assembly 31, 32, 33,
505 configured to further control the first flow of air 11 based
on a position of the piston 36.

The chamber 35 is configured to be connected with the
flow control valve 22 such that the pneumatic suspension
arrangement 20 is operative to push the piston 36 into the
NNF 40 of the chamber 35 based on a flow rate of the first
flow of air 11. In other words, the pneumatic suspension arrangement 20 may be configured such that the chamber 35
is connected with the flow control valve 22 such that the first
flow of air 11 is arranged to push the piston 36 into the NNF
40 of the chamber 35.

Figure 9:
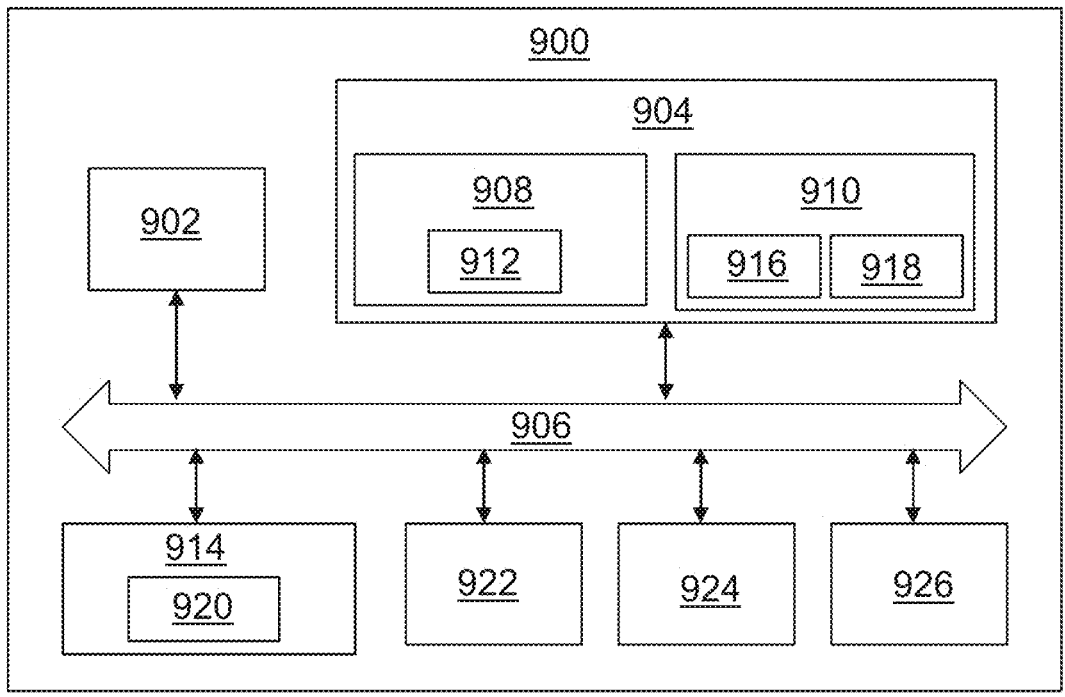
FIG. 9 is a schematic diagram of a computer system, according to an example.

FIG. 9 is a schematic diagram of the computer system 900
for implementing examples disclosed herein. The computer
system 900 is adapted to execute instructions from a com-
puter-readable medium to perform these and/or any of the
functions or processing described herein. The computer
system 900 may be connected (e.g., networked) to other
machines in a LAN, an intranet, an extranet, or the Internet.
While only a single device is illustrated, the computer
system 900 may include any collection of devices that
individually or jointly execute a set (or multiple sets) of
instructions to perform any one or more of the methodolo-
gies discussed herein. Accordingly, any reference in the
disclosure and/or claims to a computer system, computing
system, computer device, computing device, control system,
control unit, electronic control unit (ECU), processor device,
processing circuitry, etc., includes reference to one or more
such devices to individually or jointly execute a set (or
multiple sets) of instructions to perform any one or more of
the methodologies discussed herein. For example, control
system may include a single control unit or a plurality of
control units connected or otherwise communicatively
coupled to each other, such that any performed function may
be distributed between the control units as desired. Further,
such devices may communicate with each other or other
devices by various system architectures, such as directly or
via a Controller Area Network (CAN) bus, etc.

The computer system 900 may comprise at least one
computing device or electronic device capable of including
firmware, hardware, and/or executing software instructions
to implement the functionality described herein. The com-
puter system 900 may include the processing circuitry 902
(e.g., processing circuitry including one or more processor
devices or control units), a memory 904, and a system bus
906. The computer system 900 may include at least one
computing device having the processing circuitry 902. The
system bus 906 provides an interface for system components
including, but not limited to, the memory 904 and the
processing circuitry 902. The processing circuitry 902 may
include any number of hardware components for conducting
data or signal processing or for executing computer code
stored in memory 904. The processing circuitry 902 may, for
example, include a general-purpose processor, an applica-
tion specific processor, a Digital Signal Processor (DSP), an
Application Specific Integrated Circuit (ASIC), a Field
Programmable Gate Array (FPGA), a circuit containing
processing components, a group of distributed processing
components, a group of distributed computers configured for
processing, or other programmable logic device, discrete
gate or transistor logic, discrete hardware components, or
any combination thereof designed to perform the functions
described herein. The processing circuitry 902 may further
include computer executable code that controls operation of
the programmable device.

The system bus 906 may be any of several types of bus
structures that may further interconnect to a memory bus
(with or without a memory controller), a peripheral bus,
and/or a local bus using any of a variety of bus architectures.
The memory 904 may be one or more devices for storing
data and/or computer code for completing or facilitating
methods described herein. The memory 904 may include
database components, object code components, script com-
ponents, or other types of information structure for support-
ing the various activities herein. Any distributed or local memory device may be utilized with the systems and methods of this description. The memory 904 may be communicably connected to the processing circuitry 902 (e.g., via a circuit or any other wired, wireless, or network connection) and may include computer code for executing one or more processes described herein. The memory 904 may include non-volatile memory 908 (e.g., read-only memory (ROM), erasable programmable read-only memory (EPROM), electrically erasable programmable read-only memory (EEPROM), etc.), and volatile memory 910 (e.g., random-access memory (RAM)), or any other medium which can be used to carry or store desired program code in the form of machine-executable instructions or data structures and which can be accessed by a computer or other machine with processing circuitry 902. A basic input/output system (BIOS) 912 may be stored in the non-volatile memory 908 and can include the basic routines that help to transfer information between elements within the computer system 900.

The computer system 900 may further include or be coupled to a non-transitory computer-readable storage medium such as the storage device 914, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 914 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 914 and/or in the volatile memory 910, which may include an operating system 916 and/or one or more program modules 918. All or a portion of the examples disclosed herein may be implemented as a computer program 920 stored on a transitory or non-transitory computer-usable or computer-readable storage medium (e.g., single medium or multiple media), such as the storage device 914, which includes complex programming instructions (e.g., complex computer-readable program code) to cause the processing circuitry 902 to carry out actions described herein. Thus, the computer-readable program code of the computer program 920 can comprise software instructions for implementing the functionality of the examples described herein when executed by the processing circuitry 902. In some examples, the storage device 914 may be a computer program product (e.g., readable storage medium) storing the computer program 920 thereon, where at least a portion of a computer program 920 may be loadable (e.g., into a processor) for implementing the functionality of the examples described herein when executed by the processing circuitry 902. The processing circuitry 902 may serve as a controller or control system for the computer system 900 that is to implement the functionality described herein.

The computer system 900 may include an input device interface 922 configured to receive input and selections to be communicated to the computer system 900 when executing instructions, such as from a keyboard, mouse, touch-sensitive surface, etc. Such input devices may be connected to the processing circuitry 902 through the input device interface 922 coupled to the system bus 906 but can be connected through other interfaces, such as a parallel port, an Institute of Electrical and Electronic Engineers (IEEE) 1394 serial port, a Universal Serial Bus (USB) port, an IR interface, and the like. The computer system 900 may include an output device interface 924 configured to forward output, such as to a display, a video display unit (e.g., a liquid crystal display (LCD) or a cathode ray tube (CRT)). The computer system 900 may include a communications interface 926 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Below follows a number of Examples. Below Examples may be combined with above Examples in any suitable manner.

Example 1

A pneumatic suspension arrangement 20 for a vehicle 10, the pneumatic suspension arrangement 20 comprising
an air bellow 24 for suspending the vehicle 10,
a source of pressurized air 23,
a flow control valve 22 for controlling a first flow of air 11, wherein the first flow of air 11 is arranged to be directed from the source of pressurized air 23 to the air bellow 24, or from the air bellow 24 to an exhaust 25 of the flow control valve 22, wherein the flow control valve 22 is configured to control a flow rate and direction of the first flow of air 11 based on a ride height of the vehicle 10,
a chamber 35 containing a Non-Newtonian Fluid, NNF, 40,
a piston 36 configured to be moveable within the chamber 35, and wherein the chamber 35 and piston 36 is configured such that said NNF 40 is able to flow around the piston 36 in response to a movement of the piston 36 within the chamber 35, and
a valve assembly 31, 32, 33, 505 configured to further control the first flow of air 11 based on a position of the piston 36; and
wherein the chamber 35 is configured to be connected with the flow control valve 22 such that the pneumatic suspension arrangement 20 is operative to push the piston 36 into the NNF 40 of the chamber 35 based on a flow rate of the first flow of air 11.

Example 2

The pneumatic suspension arrangement 20 according to Example 1 further configured such that the flow control valve 22 is operative to control the first flow of air 11 based on a control flow of air 12, 13, and wherein the valve assembly 31, 32, 33, 505 is configured to control the control flow of air 12, 13 based on the position of the piston 36.

Example 3

The pneumatic suspension arrangement 20 according to any of Examples 1-2 further configured such that when the piston 36 is positioned outside a first section 37 of the chamber 35, the first flow of air 11 is blocked by the pneumatic suspension arrangement 20.

Example 4

The pneumatic suspension arrangement 20 according to any of Examples 1-3 further configured such that the valve assembly 31, 32, 33, 505 comprises a first channel 31 comprised in the piston 36, and wherein the first channel 31 is arranged to control the first flow of air 11 based on an alignment of the first channel 31 with a first inlet 51*a* and a first outlet 51*b* of the chamber 35, and wherein the pneumatic suspension arrangement 20 is configured such that the first flow of air 11 is directed to flow to the air bellow 24 or to the exhaust 25, via the first inlet 51*a*, the first channel 31, and the first outlet 52*b*.

Example 5

The pneumatic suspension arrangement 20 according to any of Examples 1-4, further configured such that the valve assembly 31, 32, 33, 505 comprises a second channel 32 comprised in the piston 36, and wherein the second channel 32 is arranged to control a second flow of air 12 based on an alignment of the second channel 32 with a second inlet 52*a* and a second outlet 52*b* of the chamber 35, and wherein the pneumatic suspension arrangement 20 is configured such that the second flow of air 12 is a flow directed from a second control air pressure source 404 via the second inlet 52*a*, the second channel 32, and the second outlet 52*b*, to a block port 405 of the flow control valve 22, which when pressurized, the flow control valve 22 is configured to restrict or block the first flow of air 11 from passing through the flow control valve 22.

Example 6

The pneumatic suspension arrangement 20 according to any of Examples 1-5, further configured such that the valve assembly 31, 32, 33, 505 comprises a third channel 33 comprised in the piston 36, and wherein the third channel 33 is arranged to control a third flow of air 13 based on an alignment of the third channel 33 with a third a third inlet 53*a* and third outlet 53*b* of the chamber 35, and wherein the pneumatic suspension arrangement 20 is configured such that the third flow of air 13 is a flow directed to flow from a third control air pressure source 408 via the third inlet 53*a*, the third channel 33, and the third outlet 53*b*, to a control port 409 of the flow control valve 22, which when pressurized, the flow control valve 22 is configured to allow the first flow of air 11 to pass through the flow control valve 22.

Example 7

The pneumatic suspension arrangement 20 according to any preceding Examples wherein the NNF 40 is a dilatant NNF.

Example 8

The pneumatic suspension arrangement 20 according to any of the preceding Examples further configured such that the first flow of air 11 is controlled by a lever 26 of the flow control valve 22 and wherein the lever 26 is configured to control the flow rate and the direction of the first flow of air 11.

Example 9

The pneumatic suspension arrangement 20 according to Example 8, further configured such that the lever 26 is connected with, and controlled by, a push rod 27, wherein the push rod 27 is connected with an axle 28 of the vehicle 10, and wherein the push rod 27 is arranged to control the lever 26 when a ride height of the vehicle 10 changes with respect to the axle 28.

Example 10

The pneumatic suspension arrangement 20 according to any one of the preceding Examples further comprising a motor 45 configured to excite the NNF 40 based on a trigger condition, wherein exciting the NNF 40 comprises applying a force to the NNF 40 using said motor 45.

Example 11

The pneumatic suspension arrangement 20 according to Example 10 wherein the motor 45 is configured to excite the NNF 40 by any one or more out of:
vibrating the chamber 35,
pushing a second piston 39 into the chamber 35 with a force increasing or maintaining the viscosity of the NNF 40, and
driving a pump configured to pulsate the first flow of air 11.

Example 12

The pneumatic suspension arrangement 20 according to any one of Examples 10-11 wherein the motor is configured to excite the NNF 40 repeatedly, as long as the trigger condition is fulfilled.

Example 13

A computer system 900 comprising processing circuitry 902 configured to control a motor 45 in a pneumatic suspension arrangement 20 according to any of Examples 10-12, the processing circuitry 902 being configured to excite a Non-Newtonian Fluid, NNF, 40 of the pneumatic suspension arrangement 20 based on a trigger condition, and wherein the processing circuitry 902 is configured to excite the NNF by applying a force to the NNF using said motor 45.

Example 14

The computer system 900 of Example 13, wherein the processing circuitry 902 is further configured to excite the NNF 40 repeatedly, as long as the trigger condition is fulfilled.

Example 15

A vehicle 10 comprising the pneumatic suspension arrangement 20 of any of Examples 1-13.

Example 16

The vehicle 10 of Example 15 further comprising the computer system of any of Examples 13-14.

Example 17

A computer-implemented method for controlling a motor 45 in a pneumatic suspension arrangement 20 according to any of Examples 10-12, the method comprising: by a processing circuitry 902 of a computer system 900, exciting 601, 701 a Non-Newtonian Fluid, NNF, 40 of the pneumatic suspension arrangement 20 based on a trigger condition.

Example 18

The method of Example 17, further comprising: by the processing circuitry 902 of the computer system 900, repeating 602 exciting the NNF 40 of the pneumatic suspension arrangement 20 as long as the trigger condition is fulfilled.

Example 19

A computer program product comprising program code for performing, when executed by the processing circuitry 902, the method of any of Examples 17-18.

Example 20

A non-transitory computer-readable storage medium comprising instructions, which when executed by the processing circuitry 902, cause the processing circuitry 902 to perform the method of any of Examples 17-18.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A pneumatic suspension arrangement for a vehicle, the pneumatic suspension arrangement comprising:
    an air bellow for suspending the vehicle;
    a source of pressurized air;
    a flow control valve for controlling a first flow of air, wherein the first flow of air is arranged to be directed from the source of pressurized air to the air bellow, or from the air bellow to an exhaust of the flow control valve, wherein the flow control valve is configured to control a flow rate and direction of the first flow of air based on a ride height of the vehicle;
    a chamber containing a Non-Newtonian Fluid (NNF);
    a piston configured to be moveable within the chamber, and wherein the chamber and piston is configured such that the NNF is able to flow around the piston in response to a movement of the piston within the chamber; and
    a valve assembly configured to further control the first flow of air based on a position of the piston;
    wherein the chamber is configured to be connected with the flow control valve such that the pneumatic suspension arrangement is operative to push the piston into the NNF of the chamber based on the flow rate of the first flow of air.

2. The pneumatic suspension arrangement of claim 1, further configured such that the flow control valve is operative to control the first flow of air based on a control flow of air, and wherein the valve assembly is configured to control the control flow of air based on the position of the piston.

3. The pneumatic suspension arrangement of claim 1, further configured such that when the piston is positioned outside a first section of the chamber, the first flow of air is blocked by the pneumatic suspension arrangement.

4. The pneumatic suspension arrangement of claim 1, further configured such that the valve assembly comprises a first channel comprised in the piston, and wherein the first channel is arranged to control the first flow of air based on an alignment of the first channel with a first inlet and a first outlet of the chamber, and wherein the pneumatic suspension arrangement is configured such that the first flow of air is directed to flow to the air bellow or to the exhaust, via the first inlet, the first channel, and the first outlet.

5. The pneumatic suspension arrangement of claim 1, further configured such that the valve assembly comprises a second channel comprised in the piston, and wherein the second channel is arranged to control a second flow of air based on an alignment of the second channel with a second inlet and a second outlet of the chamber, and wherein the pneumatic suspension arrangement is configured such that the second flow of air is a flow directed from a second control air pressure source via the second inlet, the second channel, and the second outlet, to a block port of the flow control valve, which when pressurized, the flow control valve is configured to restrict or block the first flow of air from passing through the flow control valve.

6. The pneumatic suspension arrangement of claim 1, further configured such that the valve assembly comprises a third channel comprised in the piston, and wherein the third channel is arranged to control a third flow of air based on an alignment of the third channel with a third a third inlet and third outlet of the chamber, and wherein the pneumatic suspension arrangement is configured such that the third flow of air is a flow directed to flow from a third control air pressure source via the third inlet, the third channel, and the third outlet, to a control port of the flow control valve, which when pressurized, the flow control valve is configured to allow the first flow of air to pass through the flow control valve.

7. The pneumatic suspension arrangement of claim 1, wherein the NNF is a dilatant NNF.

8. The pneumatic suspension arrangement of claim 1, further configured such that the first flow of air is controlled by a lever of the flow control valve and wherein the lever is configured to control the flow rate and the direction of the first flow of air.

9. The pneumatic suspension arrangement of claim 8, further configured such that the lever is connected with, and controlled by, a push rod, wherein the push rod is connected with an axle of the vehicle, and wherein the push rod is arranged to control the lever when a ride height of the vehicle changes with respect to the axle.

10. The pneumatic suspension arrangement of claim 1, further comprising a motor configured to excite the NNF based on a trigger condition, wherein exciting the NNF comprises applying a force to the NNF using the motor.

11. A computer system comprising processing circuitry configured to control a motor in the pneumatic suspension arrangement of claim 10, the processing circuitry being configured to excite a Non-Newtonian Fluid (NNF) of the pneumatic suspension arrangement based on a trigger condition, and wherein the processing circuitry is configured to excite the NNF by applying a force to the NNF using the motor.

12. A vehicle comprising the pneumatic suspension arrangement of claim 1 and comprising a computer system comprising processing circuitry configured to control a motor in the pneumatic suspension arrangement, the processing circuitry being configured to excite a NNF of the pneumatic suspension arrangement based on a trigger condition, and wherein the processing circuitry is configured to excite the NNF by applying a force to the NNF using the motor.

13. A computer-implemented method for controlling a motor in a pneumatic suspension arrangement of claim 10, the method comprising:

by a processing circuitry of a computer system, exciting a NNF of the pneumatic suspension arrangement based on a trigger condition.

14. A computer program product comprising program code for performing, when executed by the processing circuitry, the method of claim 13.

15. A non-transitory computer-readable storage medium comprising instructions, which when executed by the processing circuitry, cause the processing circuitry to perform the method of claim 13.

* * * * *